Patented Nov. 25, 1930

1,783,057

UNITED STATES PATENT OFFICE

KURT SCHUSTER AND HEINRICH HOPFF, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRESERVATION OF LATEX

No Drawing. Application filed April 6, 1928, Serial No. 268,071, and in Germany April 20, 1927.

This invention relates to the preservation of latex.

We have found that latex can be almost completely prevented from coagulating and becoming mucinous during storage if treated with an addition of water-soluble salts of ester acids, having a neutral or alkaline reaction when dissolved in water and more especially those salts of the said nature, of ester acids obtained with mineral acids, such as diaryl phosphoric acids, methylsulfuric acid, and the like, either singly or mixed with other preservatives.

Latex mixtures prepared in this manner also possess special advantages during their further treatment, inasmuch as fillers and other additions distribute more uniformly in them. Moreover, the finished products possess higher mechanical strength than when made from a latex stabilized by means of the customary stabilizers, such as ammonia.

The following example will further illustrate how the said invention may be carried out in practice, but the invention is not limited thereto. The parts are by weight.

Example 100 parts of latex are mixed, by stirring, with 5 parts of sodium dicresylphosphate. The latex stabilized in this manner shews no tendency to coagulation. The sodium dicresylphosphate may be replaced by salts of other ester acids, such as ammonium diphenylphosphate, potassium methylsulfate, and the like. Other stabilizing substances, such as ammonia, amines, alcohols, and the like may be added besides.

What we claim is:

1. A process for the preservation of latex, which comprises adding to the latex a water soluble non-acid salt of an ester acid.

2. A process for the preservation of latex, which comprises adding to the latex a water soluble non-acid salt of an ester acid obtained from a mineral acid.

3. A process for the preservation of latex, which comprises adding to the latex a water soluble salt of an ester acid, having an alkaline reaction when dissolved in water.

4. A process for the preservation of latex, which comprises adding to the latex a water soluble non-acid salt of an ester acid obtained from a mineral acid, having an alkaline reaction when dissolved in water.

5. A process for the preservation of latex, which comprises adding to the latex an alkali metal salt of a diaryl phosphoric acid.

6. A process for the preservation of latex, which comprises adding to the latex sodium dicresylphosphate.

7. A composition of matter comprising latex and a non-acid salt of an ester acid.

8. A composition of matter comprising latex and a non-acid salt of an ester acid obtained from a mineral acid.

9. A composition of matter comprising latex and a non-acid salt of an ester acid, having an alkaline reaction when dissolved in water.

10. A composition of matter comprising latex and a non-acid salt of an ester acid obtained from a mineral acid, having an alkaline reaction when dissolved in water.

11. A composition of matter comprising latex and an alkali metal salt of a diaryl phosphoric acid.

12. A composition of matter comprising latex and sodium dicresylphosphate.

13. A composition of matter comprising latex, a non-acid salt of an ester acid and an additional preserving agent.

In testimony whereof we have hereunto set our hands.

KURT SCHUSTER.
HEINRICH HOPFF.